(12) United States Patent
Tobita et al.

(10) Patent No.: US 11,868,726 B2
(45) Date of Patent: Jan. 9, 2024

(54) NAMED-ENTITY EXTRACTION APPARATUS, METHOD, AND NON-TRANSITORY COMPUTER READABLE STORAGE MEDIUM

(71) Applicants: KABUSHIKI KAISHA TOSHIBA, Tokyo (JP); Toshiba Digital Solutions Corporation, Kawasaki (JP)

(72) Inventors: Yoshikata Tobita, Nishitokyo (JP); Masaru Suzuki, Kawasaki (JP)

(73) Assignees: KABUSHIKI KAISHA TOSHIBA, Tokyo (JP); Toshiba Digital Solutions Corporation, Kawasaki (JP)

( * ) Notice: Subject to any disclaimer, the term of this patent is extended or adjusted under 35 U.S.C. 154(b) by 477 days.

(21) Appl. No.: 17/202,752

(22) Filed: Mar. 16, 2021

(65) Prior Publication Data

US 2021/0200953 A1    Jul. 1, 2021

Related U.S. Application Data

(63) Continuation of application No. PCT/JP2019/037915, filed on Sep. 26, 2019.

(30) Foreign Application Priority Data

Sep. 28, 2018   (JP) ................. 2018-183861

(51) Int. Cl.
| | | |
|---|---|---|
| G06F 40/295 | (2020.01) | |
| G06F 16/93 | (2019.01) | |
| G06N 20/00 | (2019.01) | |
| G06F 40/166 | (2020.01) | |
| G06F 40/242 | (2020.01) | |

(52) U.S. Cl.
CPC ............ *G06F 40/295* (2020.01); *G06F 16/93* (2019.01); *G06F 40/166* (2020.01); *G06F 40/242* (2020.01); *G06N 20/00* (2019.01)

(58) Field of Classification Search
CPC ..................................................... G06F 40/295
See application file for complete search history.

(56) References Cited

U.S. PATENT DOCUMENTS

2018/0130019 A1* 5/2018 Kolb ................. G06F 16/24578
2018/0285326 A1* 10/2018 Goyal ................... G06F 16/288

FOREIGN PATENT DOCUMENTS

| JP | 62-212830 A | 9/1987 |
| JP | 2007-148785 A | 6/2007 |
| WO | WO 2006/137516 A1 | 12/2006 |

OTHER PUBLICATIONS

International Search Report dated Dec. 10, 2019 in PCT/JP2019/037915 filed Sep. 26, 2019, 1 page.

* cited by examiner

*Primary Examiner* — Ibrahim Siddo
(74) *Attorney, Agent, or Firm* — Maier & Maier, PLLC

(57) ABSTRACT

In general, according to one embodiment, a named-entity extraction apparatus according to an embodiment includes: an unit extracting, using an extraction dictionary, named entities and relations from extraction document data; a unit designating character strings corresponding to the named entities extracted among character strings in learning document data; a generator generating, by applying a relation extraction rule, a learning document in which relations between named entities belonging to the categories of the relation extraction rule among the named entities designated; and a unit learning the extraction dictionary based on the learning document.

7 Claims, 14 Drawing Sheets

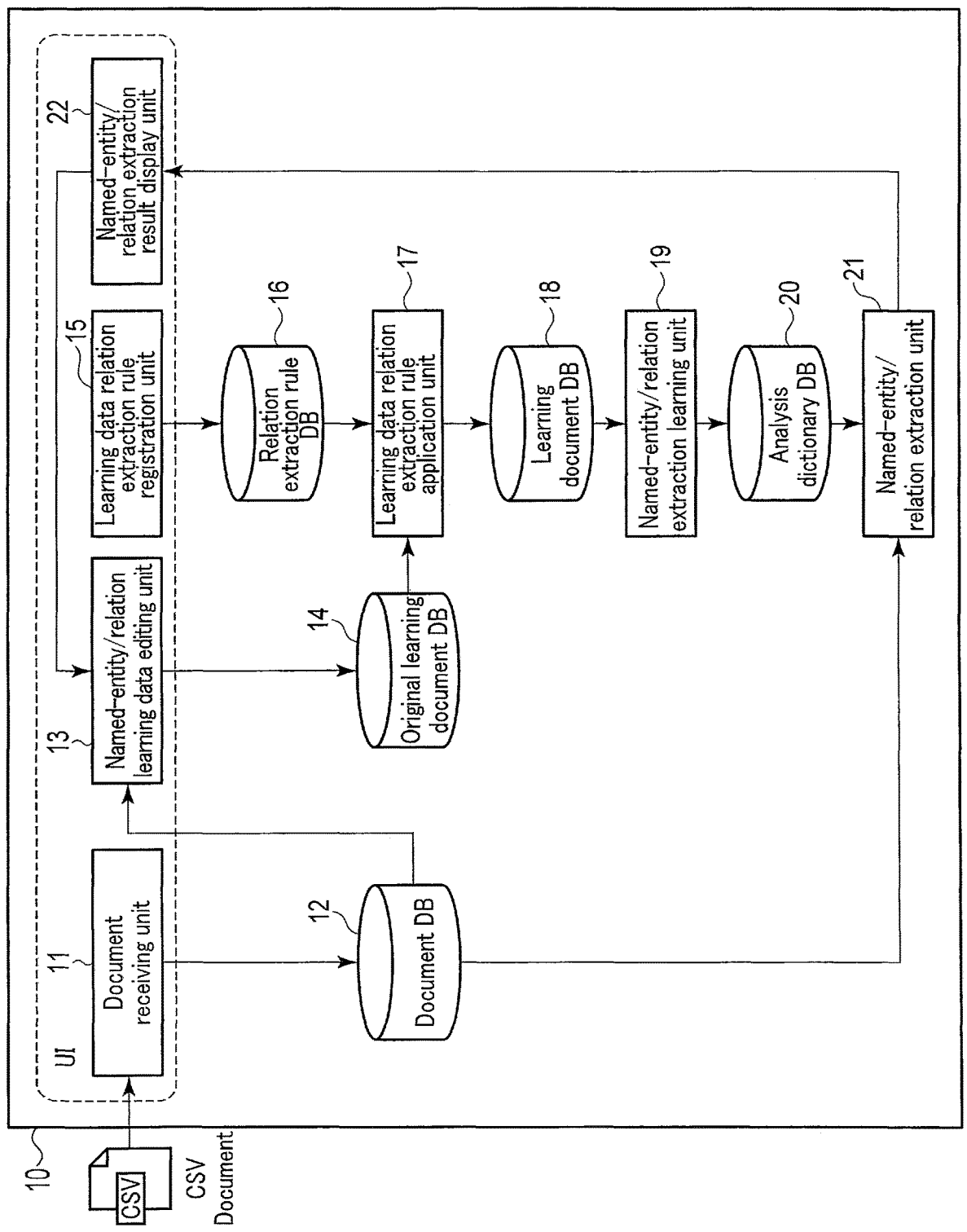
F I G. 1

| (Document DB) | | | |
|---|---|---|---|
| Content ID | Title | Text | ... |
| 1 | ... | ... | ... |
| 2 | ... | ... | ... |
| ... | ... | ... | ... |

FIG. 2

| (Original learning document DB (named entity)) | | | | |
|---|---|---|---|---|
| Tag ID | Content ID | Type of Tag | Value of Tag | ... |
| 1 | 1 | Person name | Oshiba Taro | ... |
| 2 | 1 | Place name | Oshiba cho | ... |
| ... | ... | ... | ... | ... |

FIG. 3

| (Original learning document DB (relation)) | | | | | |
|---|---|---|---|---|---|
| Relation ID | First Tag ID | Role of First Tag | Second Tag ID | Role of Second Tag | ... |
| 1 | 1 | Resident | 2 | Residential area | ... |
| 2 | 3 | Sports | 4 | Ranking | ... |
| ... | ... | ... | ... | ... | ... |

FIG. 4

| (Relation extraction rule DB (named entity)) | | | | | |
|---|---|---|---|---|---|
| Rule ID | Type of First Tag | Type of Second Tag | Role of First Tag | Role of Second Tag | ... |
| 1 | Person name | Please name | Resident | Residential area | ... |
| 2 | Sports | Ranking | Competition name | Competition result | ... |
| ... | ... | ... | ... | ... | ... |

FIG. 5

| (Analysis dictionary DB) | | | |
|---|---|---|---|
| Dictionary ID | Type of Tag | Characteristic of Tag | ... |
| 1 | Person name | Binary | ... |
| 2 | Place name | Binary | ... |
| ... | ... | ... | ... |

FIG. 6

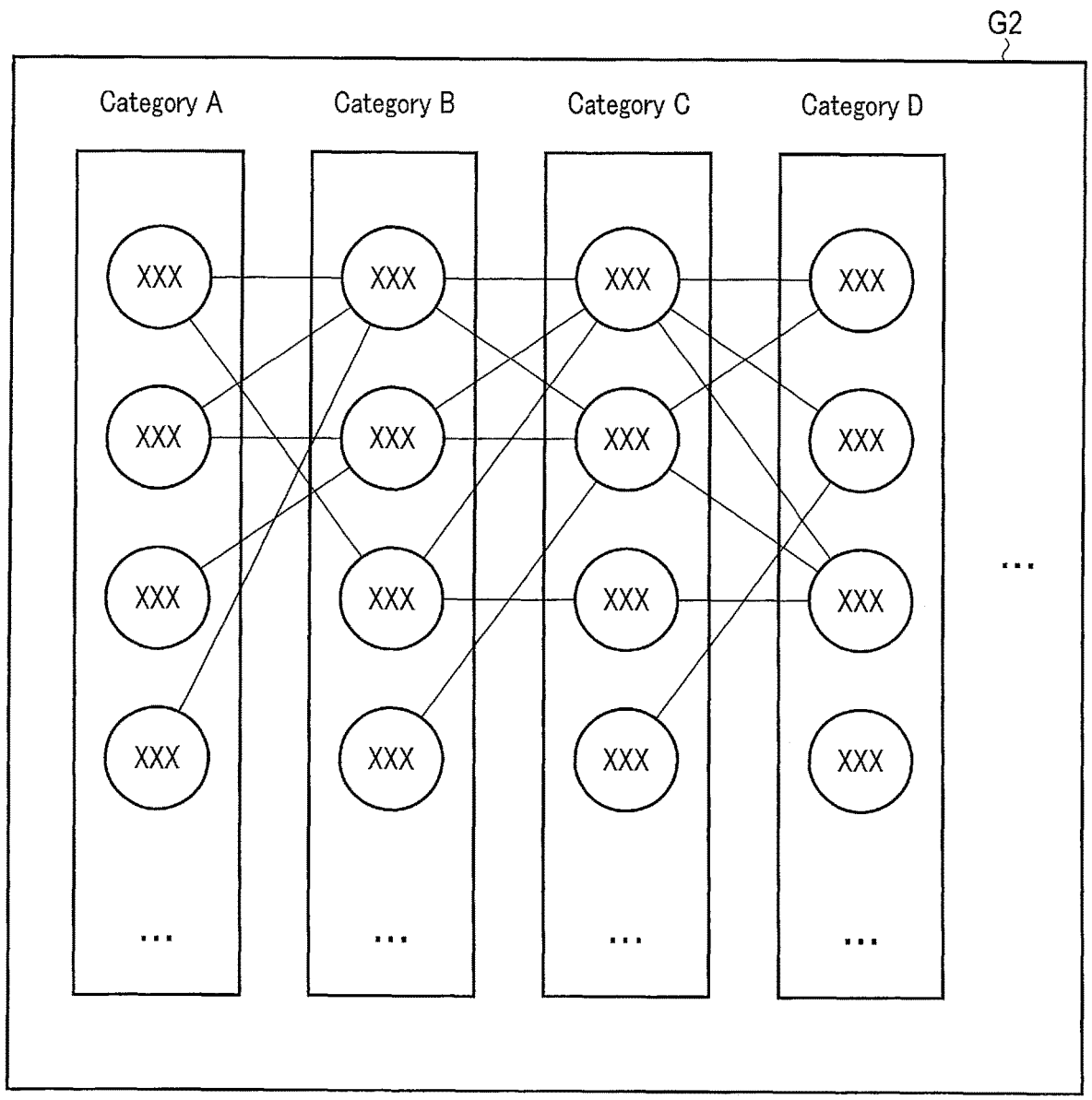
F I G. 10

G4

A failure occurred. There is an abnormal conveyance.
———————————— Phenomenon

The opening/closing unit and the arm seem to be in contact with each other.

The bolt is loose.
——— Site
———————— Cause o
...
                              L1
A cause seems to be here.

The screw attached to the arm was tightened.
———————————————— Handling o
It has been restarted.

FIG. 13

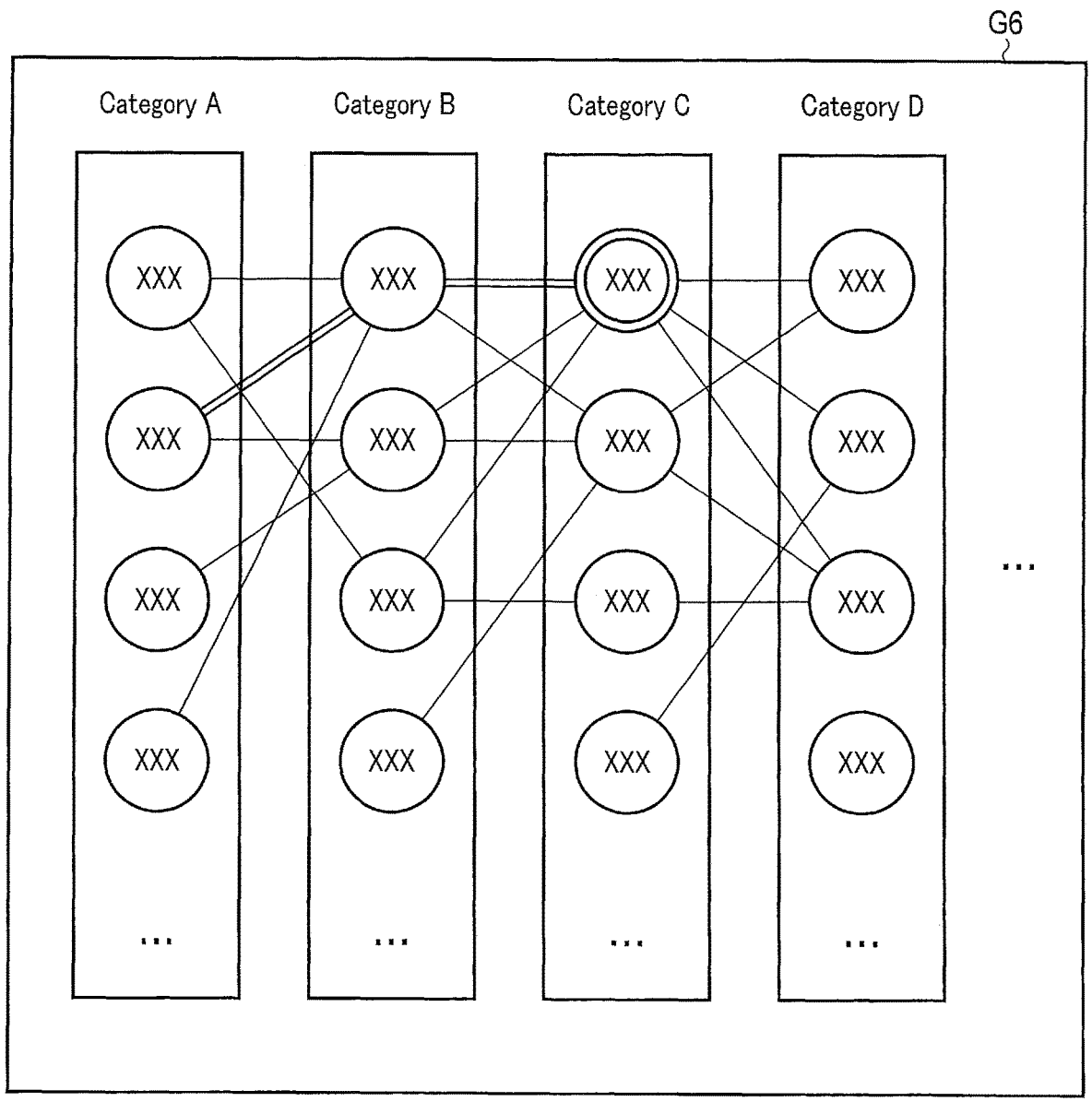
F I G. 16

NAMED-ENTITY EXTRACTION APPARATUS, METHOD, AND NON-TRANSITORY COMPUTER READABLE STORAGE MEDIUM

CROSS-REFERENCE TO RELATED APPLICATIONS

This application is a Continuation Application of PCT Application No. PCT/JP2019/037915, filed Sep. 26, 2019 and based upon and claiming the benefit of priority from Japanese Patent Application No. 2018-183861, filed Sep. 28, 2018, the entire contents of all of which are incorporated herein by reference.

FIELD

Embodiments described herein relate generally to a named-entity extraction apparatus, a method, and a non-transitory computer readable storage medium.

BACKGROUND

Conventionally, a mechanism has been proposed in which named entities appearing in document data are extracted by various methods such as manual rules or machine learning.

There is also an applied technique of determining which named entity is to be output among those extracted from document data by calculating a weight of a category name based on a degree to which the category name of the named entity appears.

However, similarly to other recognition techniques, 100% accuracy is ideally expected for named-entity extraction, and further improvement in accuracy is required.

BRIEF DESCRIPTION OF THE DRAWINGS

FIG. 1 is a block diagram illustrating a functional configuration example of a named-entity extraction apparatus according to an embodiment;

FIG. 2 illustrates, in a table format, an example of document data stored in a document DB of the named-entity extraction apparatus according to the embodiment;

FIG. 3 illustrates, in a table format, an example of learning data for a named entity stored in an original learning document database (DB) of the named-entity extraction apparatus according to the embodiment;

FIG. 4 illustrates, in a table format, an example of learning data for a relation between named entities stored in the original learning document DB of the named-entity extraction apparatus according to the embodiment;

FIG. 5 illustrates, in a table format, an example of a relation extraction rule stored in a relation extraction rule DB of the named-entity extraction apparatus according to the embodiment;

FIG. 6 illustrates, in a table format, an example of an analysis dictionary stored in an analysis dictionary DB of the named-entity extraction apparatus according to the embodiment;

FIG. 10 illustrates an example of a screen to display tags and relations between tags extracted by the named-entity extraction apparatus according to the embodiment;

FIG. 13 illustrates an example of a display screen when a relation between tags of document data is assigned by the named-entity extraction apparatus according to the embodiment;

FIG. 16 illustrates an example of a screen to display tags and relations between tags that were not learned but were extracted by the named-entity extraction apparatus according to the embodiment.

DETAILED DESCRIPTION

Figure 7:
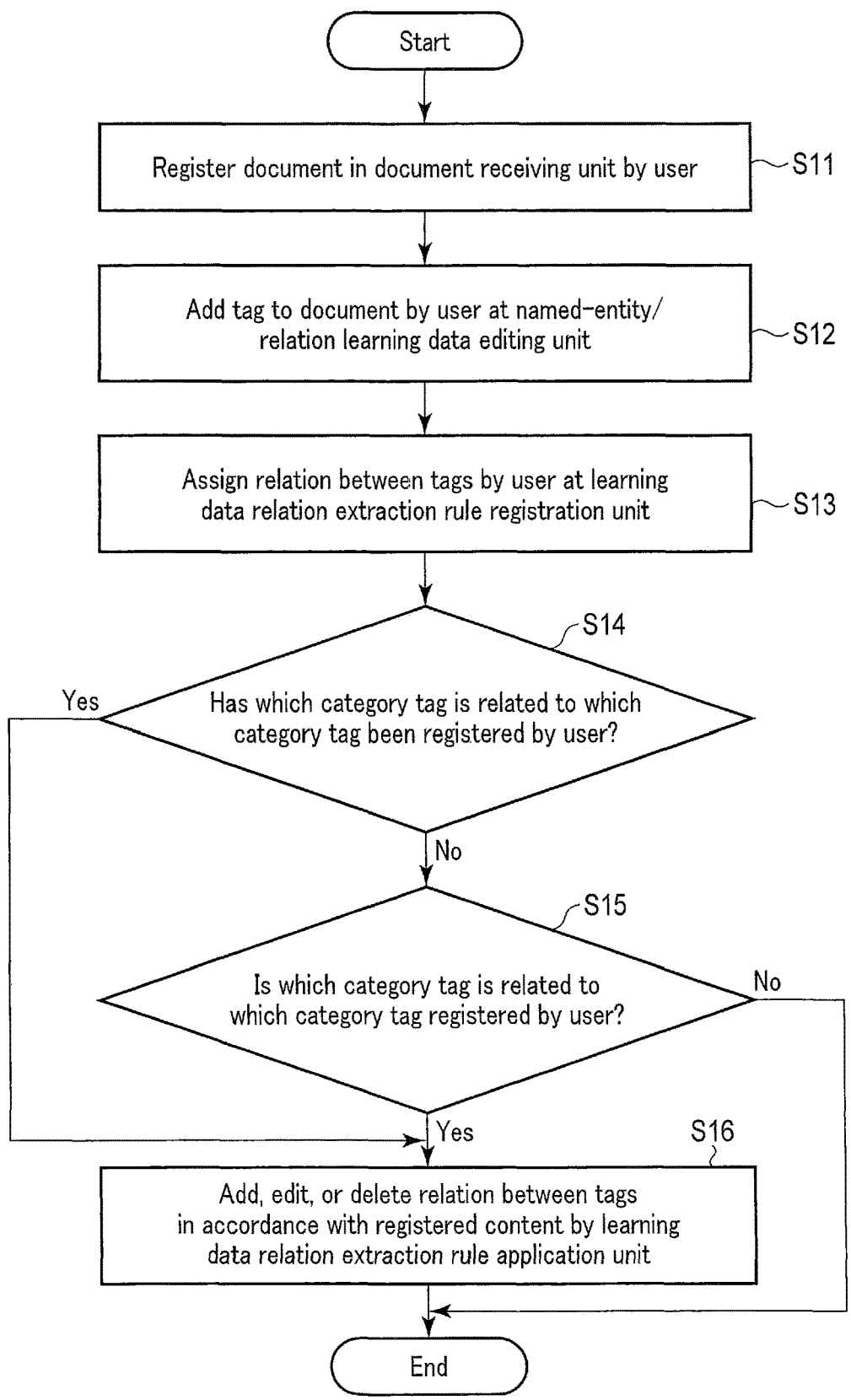
FIG. 7 is a flowchart illustrating an example of a first processing procedure performed by the named-entity extraction apparatus according to the embodiment.

Hereinafter, embodiments will be described with reference to drawings.

In general, according to one embodiment, a named-entity extraction apparatus according to an embodiment includes: a first storage device that stores an extraction dictionary used when named entities of document data and relations between named entities are extracted from the document data; a document receiving unit that receives input of extraction document data from which the named entities and the relations are extracted, and input of learning document data used for learning of the extraction dictionary; an extraction unit that extracts, using the extraction dictionary, the named entities and the relations between named entities from the extraction document data received by the document receiving unit; a designation unit that designates character strings corresponding to the named entities extracted by the extraction unit among character strings in the learning document data received by the document receiving unit; a second storage device that stores a relation extraction rule in which relations between categories of named entities extracted from the extraction document data are defined; a generator that generates, by applying the relation extraction rule stored in the second storage device, a learning document in which relations between named entities belonging to the categories defined by the relation extraction rule among the named entities designated by the designation unit are set; and a learning unit that learns the extraction dictionary based on the learning document generated by the generator.

FIG. 1 is a block diagram illustrating a functional configuration example of a named-entity extraction apparatus according to an embodiment of the present invention.

As shown in FIG. 1, a named-entity extraction apparatus 10 according to the embodiment includes a document receiving unit 11, a document database (DB) 12, a named-entity/relation learning data editing unit 13, an original learning document DB 14, a learning data relation extraction rule registration unit 15, a relation extraction rule DB 16, a learning data relation extraction rule application unit 17, a learning document DB 18, a named-entity/relation extraction learning unit 19, an analysis dictionary DB 20, a named-entity/relation extraction unit 21, and a named-entity/relation extraction result display unit 22.

The named-entity extraction apparatus 10 can be implemented by a system using a computer device such as a server computer or a personal computer (PC). This computer device will be described later.

Functions of the document receiving unit 11, the named-entity/relation learning data editing unit 13, the learning data relation extraction rule registration unit 15, the learning data relation extraction rule application unit 17, the named-entity/relation extraction learning unit 19, the named-entity/relation extraction unit 21, and the named-entity/relation extraction result display unit 22 are realized by, for example, a hardware processor of the computer device reading and executing a program stored in a storage device of the computer device.

Among the above-described functions, those of the document receiving unit 11, the named-entity/relation learning data editing unit 13, the learning data relation extraction rule registration unit 15, and the named-entity/relation extraction result display unit 22 may be realized as functions cooperating with an input device and a display device (not shown) in a user interface (UI). Examples of the input device include a keyboard and a mouse. Examples of the display device include a liquid crystal display. The input device and the output device may be those built in the named-entity extraction apparatus 10, or may be other devices, for example, those capable of performing communications via a network.

The document DB 12, the original learning document DB 14, the relation extraction rule DB 16, the learning document DB 18, and the analysis dictionary DB 20 are provided in a nonvolatile memory that can be written and read at any time.

The named-entity extraction apparatus 10 can display, on the display device, an extraction result of named entities (hereinafter also referred to as tags) in document data, in combination with an extraction result of a relation (hereinafter also referred to as a link) between named entities.

Furthermore, by causing a user to refer to the display to discover erroneous extraction and unextraction of named entities and relations between named entities, the named-entity extraction apparatus 10 can also assist the user in correcting learning data used for learning of the analysis dictionary (also referred to as an extraction dictionary) in which an extraction rule used for extraction of named entities and relations between named entities from document data is defined.

The document receiving unit 11 receives input (registration) of one or more document data pieces and stores the received document data in the document DB 12. The document data to be stored is (1) extraction document data from which named entities and relations between named entities are extracted, or (2) learning document data used for learning of an analysis dictionary in which an extraction rule used to extract named entities and relations between named entities from the extraction document data is defined.

FIG. 2 shows, in a table format, an example of document data stored in the document DB 12 of the named-entity extraction apparatus 10 according to the embodiment.

In the example shown in FIG. 2, in document data stored in the document DB 12, (1) a content ID unique to the document data, (2) title, (3) text, and the like are associated.

In accordance with a user's operation on the input device, the named-entity/relation learning data editing unit 13 designates (assigns) character strings corresponding to named entities that are to be extracted (that should be extracted) and a set of named entities to be extracted as a relation between named entities, in learning document data stored in the document DB 12, thereby generating learning data (original learning document) of the named entities and the relations between named entities. This learning data is stored in the original learning document DB 14.

The named-entity/relation learning data editing unit 13 can also be referred to as designation unit for designating character strings extracted as named entities and a set of named entities extracted as a relation between named entities.

The learning data stored in the original learning document DB 14 is classified into learning data for a named entity, and learning data for a relation between named entities.

FIG. 3 shows, in a table format, an example of learning data for a named entity stored in the original learning document DB 14 of the named-entity extraction apparatus 10 according to the embodiment.

In the example of FIG. 3, in learning data for a named entity stored in the original learning document DB 14, (1) a tag ID unique to a named entity, (2) a content ID of document data in which the named entity is described, (3) a type of a tag, (4) a value of the tag, and the like are associated.

The type of the tag is a category name of a named entity, such as "person name" or "place name". The value of the tag is a specific description of a named entity, such as a specific person name or place name.

FIG. 4 shows, in a table format, an example of learning data for a relation between named entities stored in the original learning document DB 14 of the named-entity extraction apparatus 10 according to the embodiment.

In the example of FIG. 4, in learning data for a relation between named entities stored in the original learning document DB 14, (1) a relation ID unique to a relation between named entities, (2) a first tag ID, (3) a role of a first tag, (4) a second tag ID, (5) a role of a second tag, and the like are associated.

The example of FIG. 4 shows that, as a relation regarding relation ID "1", there is a relation between the role "resident" of the named entity whose tag ID is "1" and the role "residential area" of the named entity whose tag ID is "2". Further, this example shows that, as a relation regarding relation ID "2", there is a relation between the role "sports" of the named entity whose tag ID is "3" and the role "ranking" of the named entity whose tag ID is "4".

FIG. 4 shows an example in which a relation between two types of named entities is defined in the learning data for a relation between named entities. However, the present invention is not limited to this, and a relation existing among three or more named entities may be defined in the learning data for a relation between named entities.

The learning data relation extraction rule registration unit 15 designates (registers), in accordance with a user's input operation on the UI, a relation extraction rule in which a set of category names (types) of named entities whose relation is to be extracted from the extraction document data is defined, and stores the relation extraction rule in the relation extraction rule DB 16.

FIG. 5 shows, in a table format, an example of a relation extraction rule stored in the relation extraction rule DB 16 of the named-entity extraction apparatus 10 according to the embodiment.

In the example of FIG. 5, in a relation extraction rule stored in the relation extraction rule DB 16, (1) a rule ID unique to a relation extraction rule, (2) a type of a first tag, (3) a type of a second tag, (4) a role of the first tag, (5) a role of the second tag, and the like are associated. The nonvolatile memory provided with the relation extraction rule DB 16 may be referred to as storage device in which the relation extraction rule is stored.

The example of FIG. 5 shows that, as a relation regarding rule ID "1", there is a relation among the type of the first tag "person name", the type of the second tag "location name", the role of the first tag "resident", and the role of the second tag "residential area". Further, this example shows that, as a relation regarding rule ID "2", there is a relation among the type of the first tag "sports", the type of the second tag "ranking", the role of the first tag "competition name", and the role of the second tag "competition result".

The learning data relation extraction rule application unit 17 applies the relation extraction rule stored in the relation extraction rule DB 16 to the learning data stored in the original learning document DB 14, thereby collectively registering a relation between named entities belonging to categories indicated by category names determined by the relation extraction rule among relations between named entities in the learning data.

As a result, the learning data relation extraction rule application unit 17 generates a learning document as learning data in which relations between named entities are registered. This learning document is stored in the learning document DB 18. The learning data relation extraction rule application unit 17 may be referred to as generator for generating a learning document.

Items of the learning document stored in the learning document DB 18 are the same as various learning data pieces (see FIGS. 3 and 4) stored in the original learning document DB 14.

The named-entity/relation extraction learning unit 19 reflects, in an analysis dictionary stored in the analysis dictionary DB 20, contents of the learning document stored in the learning document DB 18, thereby learning an extraction dictionary used to extract named entities and relations between named entities.

FIG. 6 illustrates, in a table format, an example of the analysis dictionary stored in the analysis dictionary DB 20 of the named-entity extraction apparatus 10 according to the embodiment.

In the example of FIG. 6, in the analysis dictionary (extraction dictionary) stored in the analysis dictionary DB 20, a dictionary ID unique to each row, a type of a tag, a characteristic of the tag, a value of the tag, a relation between tags of multiple types, and the like are associated. The characteristic of the tag indicates a description format of the tag, for example, binary data. The nonvolatile memory provided with the analysis dictionary DB 20 may be referred to as storage device in which the analysis dictionary is stored.

This analysis dictionary is a dictionary to be collated to extract named entities and relations between named entities from extraction document data. In this analysis dictionary, a learning result based on past learning document data and a learning result based on new learning document data are reflected. This analysis dictionary may be a learning device constituted by a neural network.

The named-entity/relation extraction unit 21 extracts named entities and relations between named entities from the extraction document by collating the analysis dictionary stored in the analysis dictionary DB 20 with the extraction document data stored in the document DB 12.

The named-entity/relation extraction result display unit 22 displays, on the display device, the extraction result of named entities and the extraction result of a relation between named entities obtained by the named-entity/relation extraction unit 21. The named-entity/relation extraction result display unit 22 may be referred to as output unit for outputting the extraction result of the named entities and the extraction result of the relations between named entities.

The named-entity/relation extraction result display unit 22 can also display, on the display device, the extraction result of the named entities and the extraction result of the relations between named entities in a superimposed manner. This makes it easier for the user to find erroneous extraction and non-detection of a named entity.

(First Process)

Next, a first process performed by the named-entity extraction apparatus 10 will be described.

FIG. 7 is a flowchart showing an example of a first process procedure performed by the named-entity extraction apparatus 10 according to the embodiment.

First, in accordance with a user's input operation, the document receiving unit 11 receives registration of learning document data, and stores the learning document data in the document DB 12 (S11).

The learning document data stored in the document DB 12 is displayed on the display device. While data is displayed, in accordance with a user's input operation on a description in text of the learning document data on the display screen, the named-entity/relation learning data editing unit 13 adds a mark (underline) indicating a tag (which may be referred to as "adding a tag") to the description designated by the user's input operation in the learning document data.

The learning data for a named entity generated by adding tags (see FIG. 3) is stored in the original learning document DB 14 (S12). The learning data for a relation between named entities (see FIG. 4) is not generated in the first process.

Figure 8:
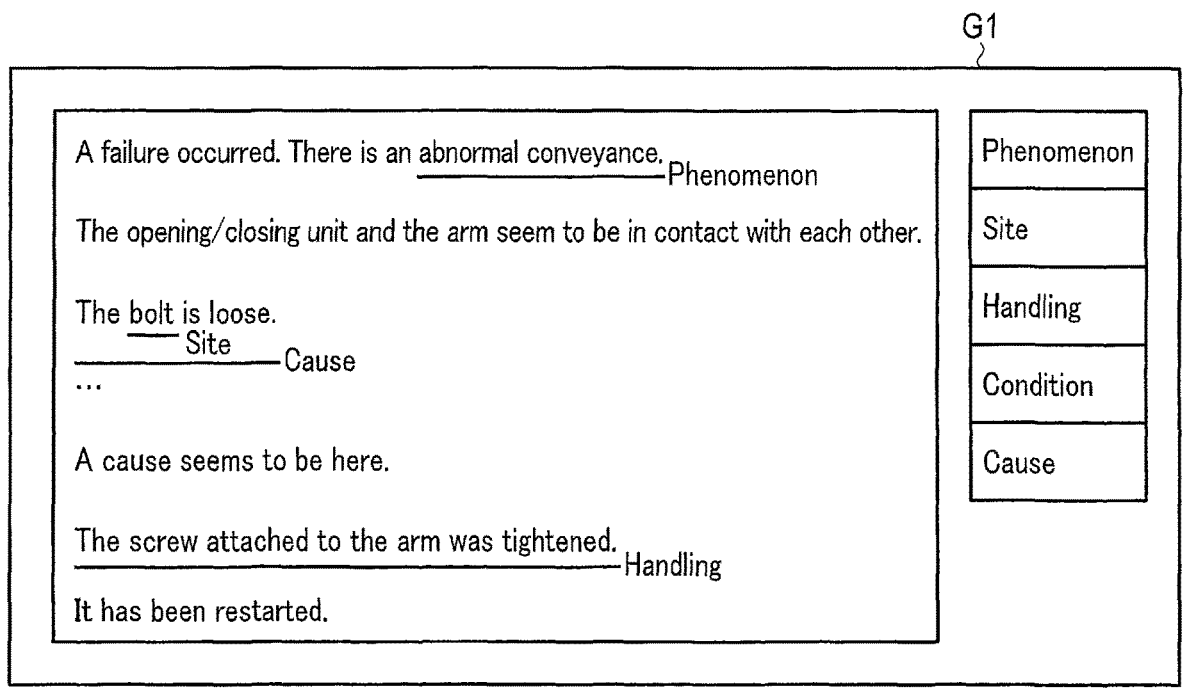
FIG. 8 illustrates an example of a display screen when a tag is added to a description in document data by the named-entity extraction apparatus according to the embodiment.

FIG. 8 illustrates an example of a screen G1 displayed when tags are added to descriptions of document data by the named-entity extraction apparatus 10 according to the embodiment.

In the example shown in FIG. 8, tags may be added, by designating with a pointer on the screen, to descriptions "abnormal conveyance", "bolt", "The bolt is loose.", and "The screw attached to the arm was tightened." in text of the document data on the screen G1 displayed on the display device of the named-entity extraction apparatus 10.

By designating a window of a category name on the screen G1 with a pointer, a category name of the tag may also be assigned to each description to which the tag is added. In the example shown in FIG. 8, a tag category name "phenomenon" may be assigned to the description "abnormal conveyance", a category name "site" may be assigned to the description "bolt", a category name "cause" may be assigned to the description "The bolt is loose.", and a category name "handling" may be assigned to the description "The screw attached to the arm was tightened.", to which the tags are added.

In accordance with a user's input operation on a setting screen (not shown) different from the screen G1, the learning data relation extraction rule registration unit 15 assigns a relation (link) between a given first category name of a tag and a given second category name of a tag.

The relation extraction rule generated by this assignment (see FIG. 5) is stored in the relation extraction rule DB 16

(S13). The above-described setting screen may be displayed side by side with the display of the learning document data of the screen G1. The assignment of the relation between given category names of tags in the first process is independent of descriptions in the learning document data. This assignment may be performed between one category name and a plurality of category names.

When a condition described below is satisfied, the learning data relation extraction rule application unit 17 adds, edits, or deletes a relation between a tag of a certain category name and a tag of another category name, which will be described later, among tags indicated in the learning data stored in the original learning document DB 14, in accordance with the registered content of the relation extraction rule stored in the relation extraction rule DB 16.

The condition is, in S13, (1) when the learning data relation extraction rule registration unit 15 has completed assignment (registration) of a relation between a tag of a certain category name and a tag of another category name to the relation extraction rule (Yes in S14), or (2) before the assignment of the relation is completed (No in S14) and when the assignment is newly performed (Yes in S15). If it is "No" in S15, the process ends.

If it is "Yes" in S14 or "Yes" in S15, the learning document generated by the processing of the learning data relation extraction rule application unit 17 is stored in the learning document DB 18 (S16). For example, if the relation extraction rule defines a relation between a category name A and a category name B, a relation is assigned between a tag belonging to the category name A and a tag belonging to the category name B in the learning data.

According to the first process described above, a relation between a tag related to a certain category name and a tag related to another category name indicated in the learning data is collectively registered.

(Second Process)

Next, a second process of the named-entity extraction apparatus 10 will be described.

Figure 9:
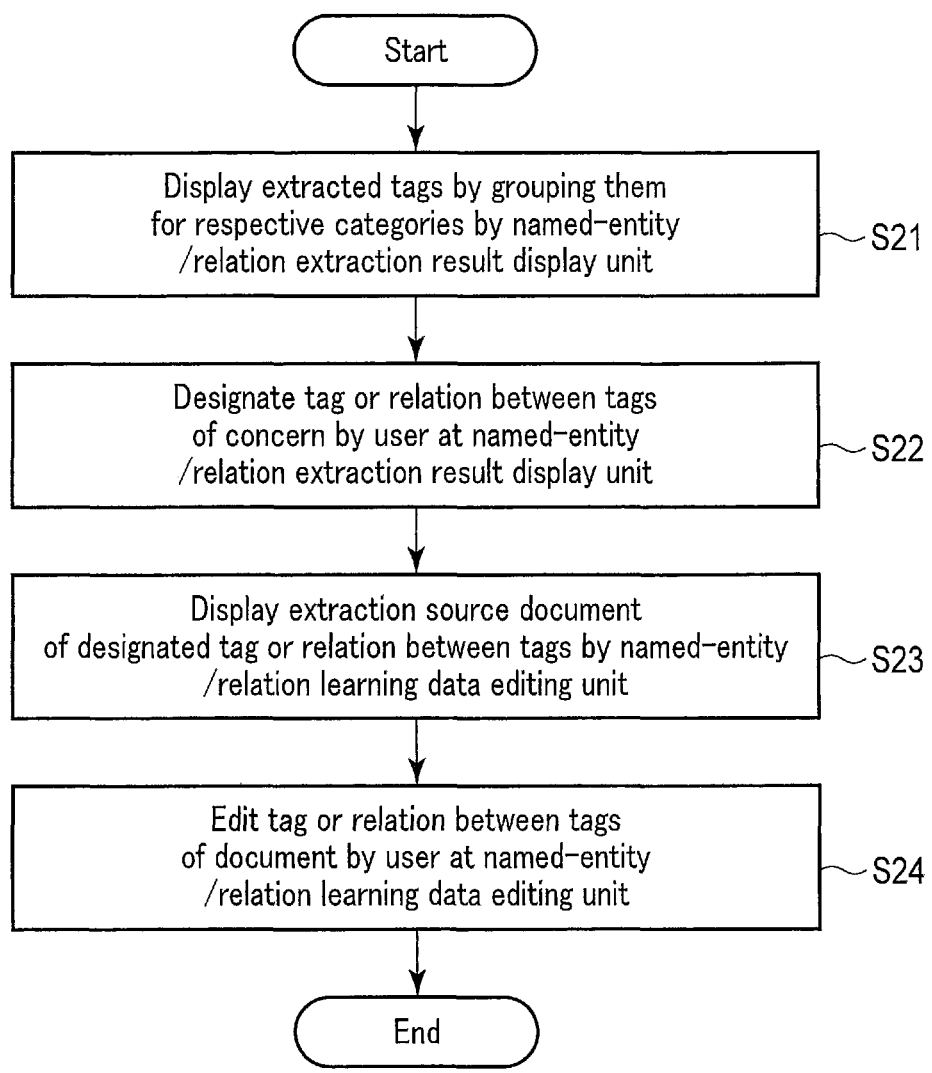
FIG. 9 is a flowchart illustrating an example of a second processing procedure performed by the named-entity extraction apparatus according to the embodiment.

FIG. 9 is a flowchart showing an example of a second process procedure performed by the named-entity extraction apparatus 10 according to the embodiment.

In the second process, first, the named-entity/relation extraction result display unit 22 displays, on the display device, a display screen G2 to display an extraction result, in which tags and relations between tags extracted from the extraction document data by the named-entity/relation extraction unit 21 are grouped for respective category names (S21). It is assumed that information indicating a relation between an extraction result by the named-entity/relation extraction unit 21 and extraction source document data is stored in an internal memory connected to the named-entity/relation extraction result display unit 22.

FIG. 10 illustrates an example of a display screen G2 to display tags and relations between extracted tags extracted by the named-entity extraction apparatus 10 according to the embodiment.

The display screen G2 of FIG. 10 shows a plurality of types of tags belonging to categories (category names) A, B, C, D, and the like, and a relation between a tag belonging to a certain category and a tag belonging to a different category.

FIG. 10 shows an example in which a relation between tags is set between categories A and B, between categories B and C, and between categories C and D. However, the present invention is not limited to this, and for example, a relation between tags may be set between categories A and C, between categories B and D, or the like.

The user can designate, by an input operation, a tag of concern or a relation of concern between tags displayed on the extraction result display screen G2 (S22).

A tag of concern or a relation of concern between tags is a tag or a relation between tags that may not be appropriate as an extraction result from the extraction document data.

In accordance with the designation in S22, the named-entity/relation extraction result display unit 22 passes the information, stored in the internal memory, indicating the relation between the extraction result by the named-entity/relation extraction unit 21 and the extraction source document to the named-entity/relation learning data editing unit 13.

In response to the designation in S22, the named-entity/relation learning data editing unit 13 searches for the extraction source document data of the designated tag or relation between tags from the information passed, and displays text or the like of the searched extraction source document data on the display device (S23).

In response to this display, the named-entity/relation learning data editing unit 13 edits the tag added to the description of the extraction source document, or the relation between tags, by the user's input operation (S24).

Figure 11:
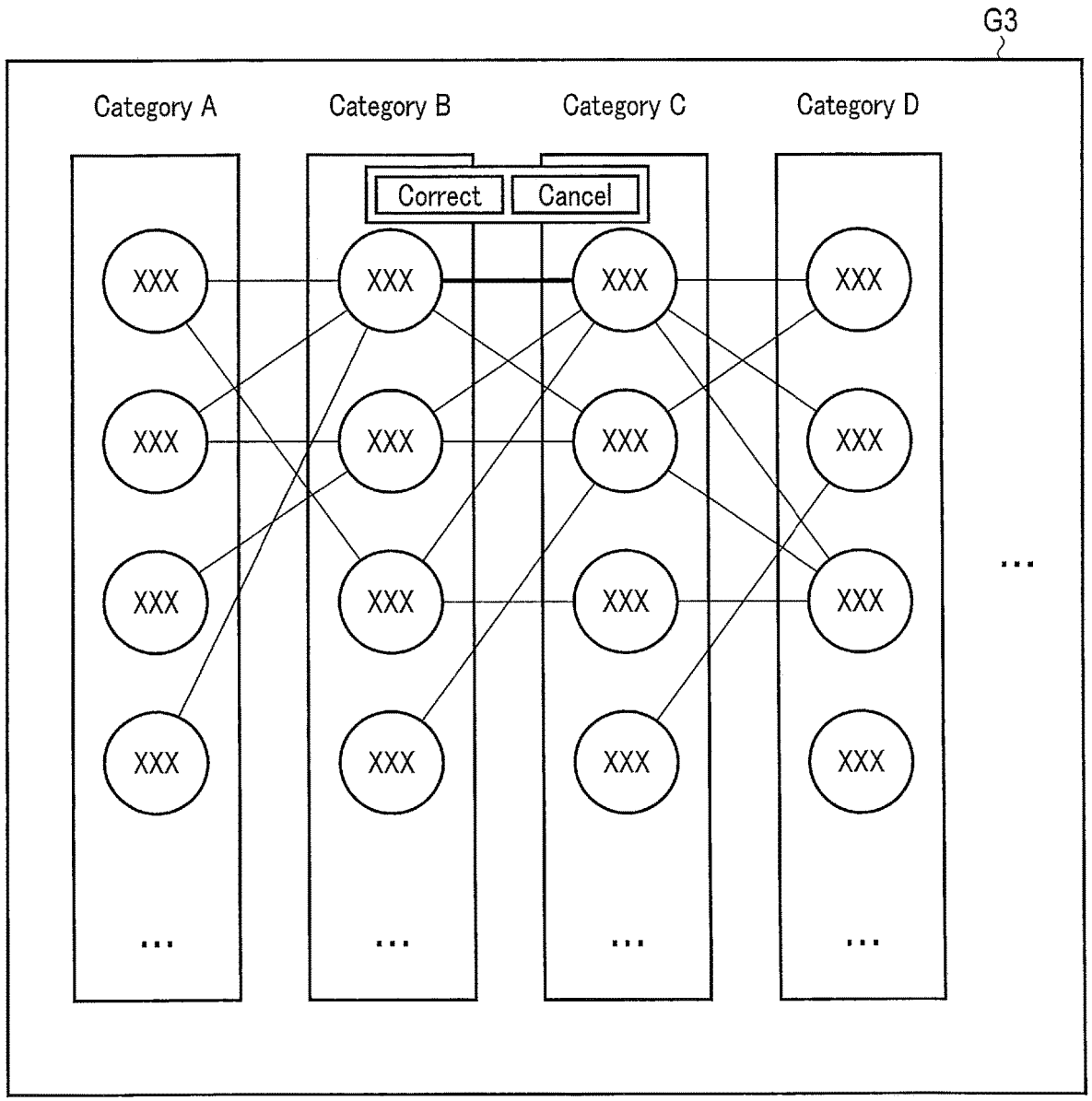
FIG. 11 illustrates an example of a screen to edit tags and relations between tags extracted by the named-entity extraction apparatus according to the embodiment.

FIG. 11 illustrates an example of an editing screen G3 to edit tags and relations between tags extracted by the named-entity extraction apparatus 10 according to the embodiment.

The example of FIG. 11 shows that the relation between the first tag belonging to category B and the first tag belonging to category C is designated as an editing target. In this screen G3, in accordance with a user's input operation, the named-entity/relation learning data editing unit 13 can change a designated relation, for example, correct the relation between the first tag belonging to category B and the second and subsequent tags belonging to category C, or delete the relation.

In addition, as described above, the assigned tag itself may be corrected or deleted. A correction of the tag itself is, for example, a correction of the category name, or a changing of the target description. A deletion of the tag itself is releasing of designation of the named entity for the target description.

According to the second process, it is possible to easily display the extraction source document of the designated extraction result among the extraction result of the tag and the extraction result of the relation between tags. Further, it is possible to easily check or edit the relation between tags.

(Third Process)

Next, a third process of the named-entity extraction apparatus 10 will be described.

Figure 12:
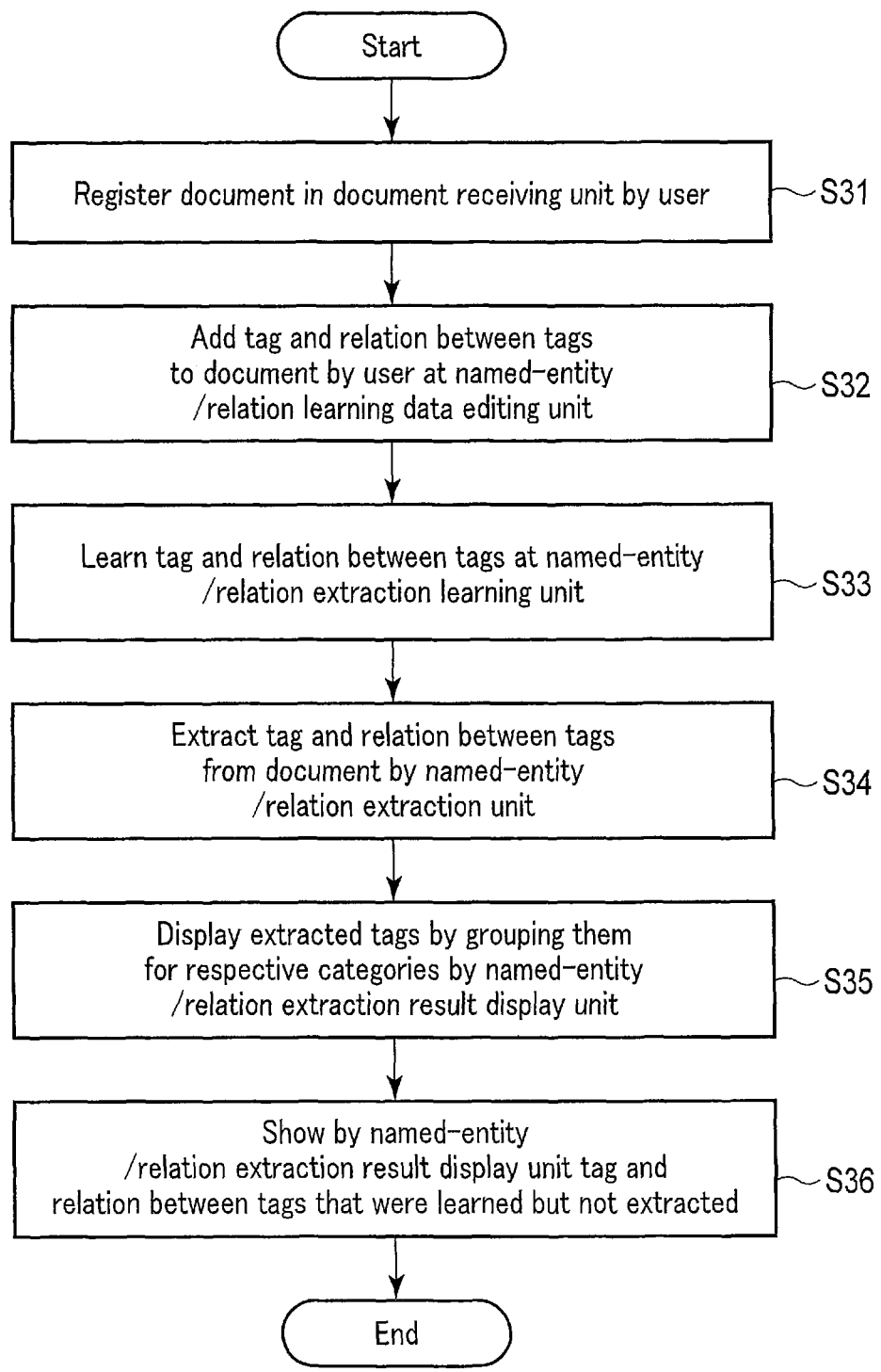
FIG. 12 is a flowchart illustrating an example of a third processing procedure performed by the named-entity extraction apparatus according to the embodiment.

FIG. 12 is a flowchart illustrating an example of a third processing procedure of the named-entity extraction apparatus 10 according to the embodiment.

First, in accordance with a user's input operation, the document receiving unit 11 receives registration of learning document data, and stores the learning document data in the document DB 12 (S31). Here, it is assumed that the extraction document data has already been stored in the document DB 12.

The learning document data stored in the document DB 12 is displayed on the display device. While the data is displayed, in accordance with a user's input operation on a description of the learning document data on the display screen, the named-entity/relation learning data editing unit 13 adds a tag to the description of the learning document data. The learning data for a named entity generated by adding tags (see FIG. 3) is stored in the original learning document DB 14.

Here, it is assumed that the display screen when the tags are added to the descriptions of the learning document is the display screen G1 illustrated in FIG. 8.

According to a user's input operation on the description of the learning document displayed on the display screen G1, the named-entity/relation learning data editing unit 13 assigns a relation (link) between the first tag and the second tag added to the description of the learning document data. The learning data for a relation between named entities generated by this assignment (see FIG. 4) is stored in the original learning document DB 14 (S32). Assignment of the relation between tags in the third process is an assignment to the description of text of the learning document data. Assigning the relation may be performed between a single tag and a plurality of tags.

FIG. 13 illustrates an example of a display screen G4 when a relation between tags in document data is assigned by the named-entity extraction apparatus 10 according to the embodiment.

FIG. 13 shows an example in which line L1 is provided. The line L1 indicates a relation between the tag related to the category name "cause" added to the first description "The bolt is loose." in text of the document data on the screen G4 displayed on the display device, and the tag related to the category name "handling" added to the second description "The screw attached to the arm was tightened." in text.

In the third process, the process by the learning data relation extraction rule registration unit 15 described in the first process is not performed, and various learning document items stored in the original learning document DB 14 in S32 are stored in the learning document DB 18 as learning documents via the learning data relation extraction rule application unit 17.

Next, the named-entity/relation extraction learning unit 19 learns an extraction rule for named entities and relations between named entities by reflecting contents of the learning document stored in the learning document DB 18 in the analysis dictionary stored in the analysis dictionary DB 20 (S33).

The named-entity/relation extraction unit 21 extracts a tag and a relation between tags from the extraction document data stored in the document DB 12 using the analysis dictionary stored in the analysis dictionary DB 20 (S34).

The named-entity/relation extraction result display unit 22 displays, on the display device, a display screen G2 to display an extraction result in which tags and relations between tags extracted in S34 are grouped for respective category names (S35).

The named-entity/relation extraction result display unit 22 collates the learning document stored in the learning document DB 18 with the extraction result obtained in S34. By this collation, the named-entity/relation extraction result display unit 22 displays, on the display device, a display screen G5 to display a result obtained by specifying a tag and a relation between tags that were generated as the learning document by the named-entity/relation extraction learning unit 19 but were not extracted from the extraction document data in S34 (S36).

The tag and the relation between tags generated as the learning document but not extracted from the extraction document data are caused by, for example, a failure in learning of the analysis dictionary by the named-entity/ relation extraction learning unit 19, which in this case is a lack of definition to be reflected in the analysis dictionary, or the like.

Figure 14:
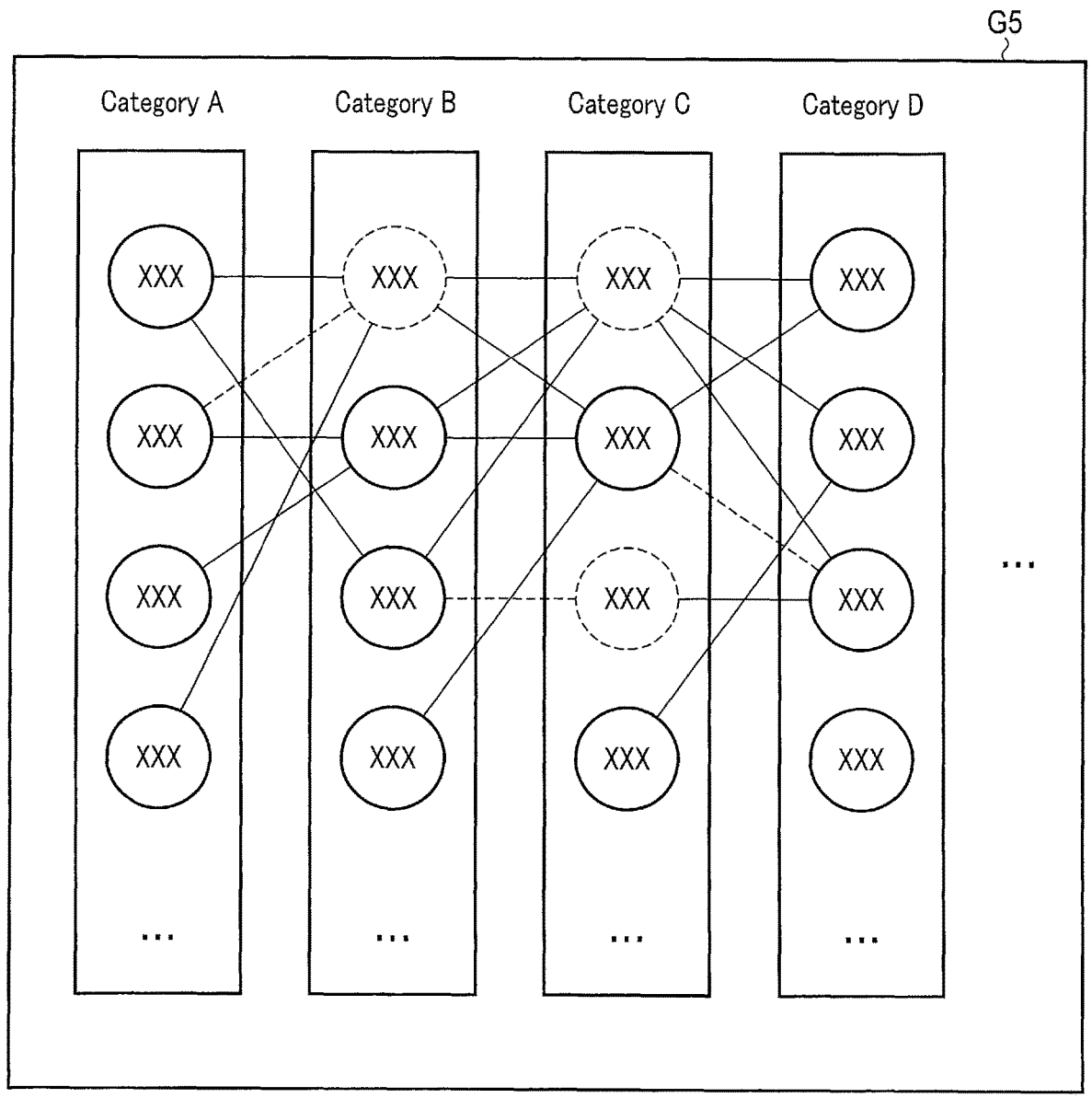
FIG. 14 illustrates an example of a screen to display tags and relations between tags that were not extracted by the named-entity extraction apparatus according to the embodiment.

FIG. 14 illustrates an example of a display screen G5 to display tags and relations between tags not extracted by the named-entity extraction apparatus 10 according to the embodiment.

The example of FIG. 14 shows that the first tag belonging to category B and the first and third tags belonging to category C surrounded by a dotted line are the tags that were included in the learning document but not extracted from the extraction document data.

The example of FIG. 14 further shows that (1) the relation between the second tag belonging to category A and the first tag belonging to category B, (2) the relation between the third tag belonging to category B and the third tag belonging to category C, and (3) the relation between the second tag belonging to category C and the third tag belonging to category D are the relations that were included in the learning document but not extracted from the extraction document data.

According to the third process, it is possible to easily check an extraction omission of extraction results of a tag and a relation between tags.

(Fourth Process)

Next, a fourth process of the named-entity extraction apparatus 10 will be described.

Figure 15:
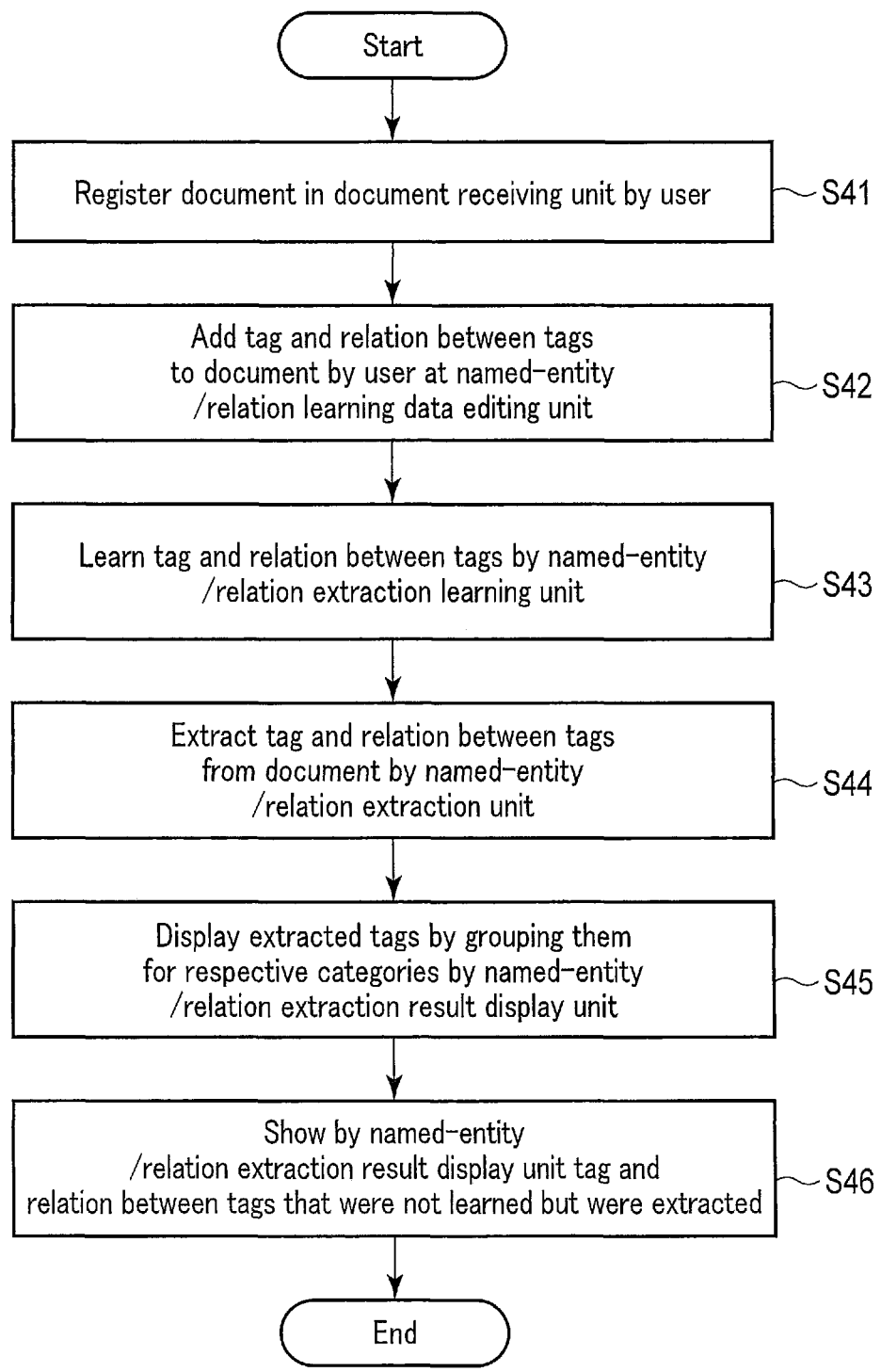
FIG. 15 is a flowchart illustrating an example of a fourth processing procedure of the named-entity extraction apparatus according to the embodiment.

FIG. 15 is a flowchart illustrating an example of a fourth processing procedure of the named-entity extraction apparatus 10 according to the embodiment.

In the fourth process, the processes from S31 to S35 described in the third process are performed (S41 to S45).

The named-entity/relation extraction result display unit 22 collates the learning document stored in the learning document DB 18 with the extraction result obtained in S44 (similar to S34).

By this collation, the named-entity/relation extraction result display unit 22 displays, on the display device, a display screen G6 to display a result obtained by specifying a tag and a relation between tags that were not generated as the learning document by the named-entity/relation extraction learning unit 19 and not defined in the analysis dictionary recently learned, but were extracted from the extraction document data in S44 (S46).

The tag and the relation between tags that were not generated as the learning document but were extracted from the extraction document data are caused by, for example, a failure in learning of the analysis dictionary by the named-entity/relation extraction learning unit 19, which in this case is an addition of unnecessary definition to the analysis dictionary, or the like.

FIG. 16 illustrates an example of a display screen G6 to display tags and relations among tags that were not learned but were extracted by the named-entity extraction apparatus 10 according to the embodiment.

The example of FIG. 16 shows that the first tag belonging to category C surrounded by a double line is that tag that was not included in the learning document but was extracted from the extraction document data.

The example of FIG. 16 further shows (1) the relation between the second tag belonging to category A and the first tag belonging to category B and (2) the relation between the first tag belonging to category B and the first tag belonging to category C, which are indicated by double lines. These relations are indicated as relations that were not included in the learning document but were extracted from the extraction document data.

By the fourth process, it is possible to easily check an erroneous extraction of an extraction result of a tag and a relation between tags.

Figure 17:
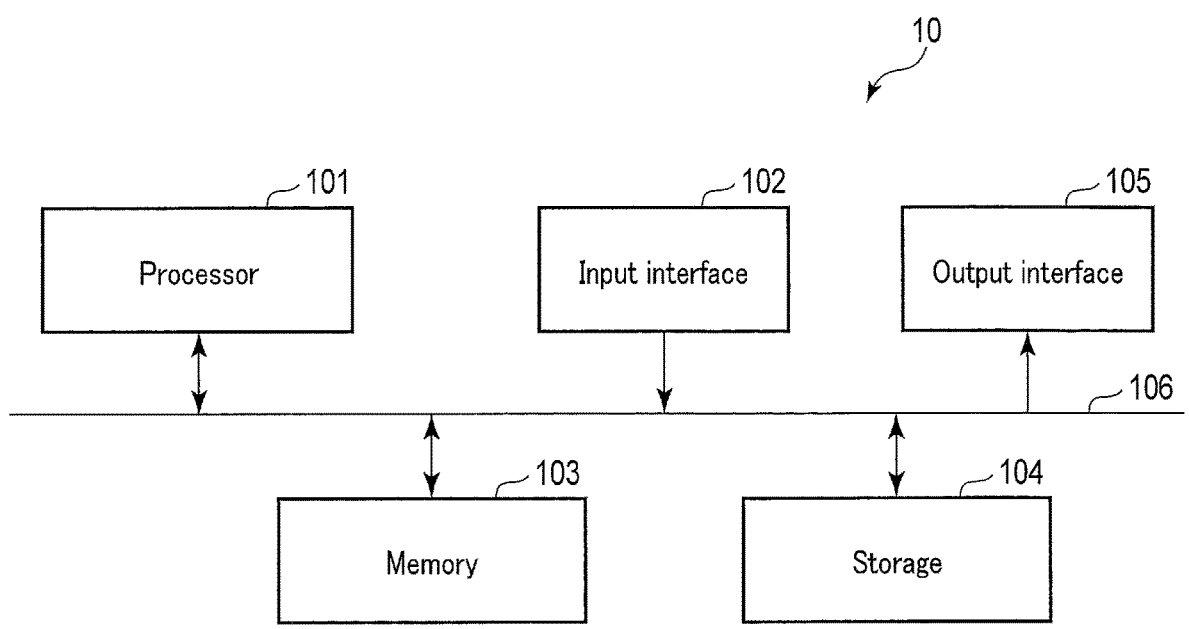
FIG. 17 is a block diagram illustrating an example of a hardware configuration of the named-entity extraction apparatus according to the embodiment.

FIG. 17 is a block diagram illustrating a hardware configuration example of the named-entity extraction apparatus 10 according to the embodiment.

As shown in FIG. 17, a computer device for implementing the named-entity extraction apparatus 10 includes a hardware processor (hereinafter referred to as a processor) 101 such as a central processing unit (CPU), an input interface 102, a memory 103 as a program memory, a storage 104, and an output interface 105, which are connected via a bus 106. The memory 103 and the storage 104 are configured by, for example, a storage device including a non-transitory tangible storage medium such as a nonvolatile memory that can be written and read at any time such as a hard disk drive (HDD) or a solid state drive (SSD).

Functions of the document receiving unit 11, the named-entity/relation learning data editing unit 13, the learning data relation extraction rule registration unit 15, the learning data relation extraction rule application unit 17, the named-entity/relation extraction learning unit 19, the named-entity/relation extraction unit 21, and the named-entity/relation extraction result display unit 22 are realized by, for example, the processor 101 reading and executing a program stored in the memory 103. A part or all of these functions may be realized by a circuit such as an application specific integrated circuit (ASIC).

The document DB 12, the original learning document DB 14, the relation extraction rule DB 16, the learning document DB 18, the analysis dictionary DB 20, and the internal memory may be realized by the storage 104. The storage 104 stores various types of data acquired and created in the course of performing various types of processing according to an embodiment.

The user interface may be realized by the input interface 102 and the output interface 105.

As described above, the named-entity extraction apparatus according to the embodiment can collectively register the relation between tags in learning data, easily display an extraction source document, and easily check extraction omission or erroneous extraction of an extraction result. Therefore, it is possible to improve an accuracy of named-entity extraction from a document.

As a program (software means) that can be executed by a computer, the method described in each embodiment can be distributed by being stored in a storage medium such as a magnetic disk (a floppy disk (trademark), a hard disk, etc.), an optical disk (CD-ROM, DVD, MO, etc.), and a semiconductor memory (ROM, RAM, flash memory, etc.), or by being transmitted by a communication medium. The program stored on the medium side also includes a setting program for causing the software means that is to be executed by the computer (including not only an execution program but also a table structure and a data structure) to be configured in the computer. The computer that realizes the present device reads a program stored in a storage medium, and, in some cases, constructs software means by the setting program, and executes the above-mentioned processing by causing operations to be controlled by the software means. The storage medium referred to in this specification is not limited to distribution, and includes a storage medium such as a magnetic disk and a semiconductor memory provided in a device that is connected via the inside of the computer or a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made. The accompanying claims and their equivalents are intended to cover such forms or modifications as would fall within the scope of the inventions.

The invention claimed is:

1. A named-entity extraction apparatus, comprising:
a first storage device that stores an extraction dictionary used when named entities of document data and relations between named entities are extracted from the document data;
a document receiving unit that receives input of extraction document data from which the named entities and the relations are extracted, and input of learning document data used for learning of the extraction dictionary;
an extraction unit that extracts, using the extraction dictionary, the named entities and the relations between named entities from the extraction document data received by the document receiving unit;
a designation unit that designates character strings corresponding to the named entities extracted by the extraction unit among character strings in the learning document data received by the document receiving unit;
a second storage device that stores a relation extraction rule in which relations between categories of named entities extracted from the extraction document data are defined;
a generator that generates, by applying the relation extraction rule stored in the second storage device, a learning document in which relations between named entities belonging to the categories defined by the relation extraction rule among the named entities designated by the designation unit are set; and
a learning unit that learns the extraction dictionary based on the learning document generated by the generator.

2. The apparatus according to claim 1, further comprising:
a first output unit that outputs the named entities extracted by the extraction unit;
a second output unit that outputs extraction source document data of a designated named entity among the named entities output by the first output unit; and
an editing unit that edits the named entities of the extraction source document data output by the second output unit.

3. The apparatus according to claim 1, further comprising:
a first output unit that outputs the relations between named entities extracted by the extraction unit;
a second output unit that outputs extraction source document data of a designated relation between named entities among the relations between named entities displayed by the first input unit; and
an editing unit that edits the relations between named entities of the extraction source document data output by the second output unit.

4. A named-entity extraction apparatus, comprising:
a storage device that stores an extraction dictionary used when named entities of document data and relations between named entities are extracted from the document data;
a document receiving unit that receives input of extraction document data from which the named entities and the relations are extracted, and input of learning document data used for learning of the extraction dictionary;
an extraction unit that extracts, using the extraction dictionary, the named entities and the relations between named entities from the extraction document data received by the document receiving unit;

a designation unit that designates character strings corresponding to the named entities and relations between named entities extracted by the extraction unit among character strings in the learning document data received by the document receiving unit;

a learning unit that learns the extraction dictionary based on the character strings corresponding to the named entities and the relations between named entities designated by the designation unit; and an output unit that outputs a character string corresponding to a named entity and a relation between named entities not extracted by the extraction unit among the character strings corresponding to the named entities and the relations between named entities designated by the designation unit.

5. A named-entity extraction apparatus, comprising:

a storage device that stores an extraction dictionary used when named entities of document data and relations between named entities are extracted from the document data;

a document receiving unit that receives input of extraction document data from which the named entities and the relations are extracted, and input of learning document data used for learning of the extraction dictionary;

an extraction unit that extracts, using the extraction dictionary, the named entities and the relations between named entities from the extraction document data received by the document receiving unit;

a designation unit that designates character strings corresponding to the named entities and relations between named entities extracted by the extraction unit among character strings in the learning document data received by the document receiving unit;

a learning unit that learns the extraction dictionary based on the character strings corresponding to the named entities and the relations between named entities designated by the designation unit; and an output unit that outputs the character strings corresponding to the named entities and the relations between named entities extracted by the extraction unit among character strings corresponding to named entities and relations between named entities not designated by the designation unit.

6. A method applied to a named-entity extraction apparatus, the method comprising:

receiving input of extraction document data from which named entities and relations between named entities are extracted, and input of learning document data used for learning of an extraction dictionary used when named entities of extraction document data and relations between named entities are extracted from the extraction document data;

extracting, using the extraction dictionary used when named entities of document data and relations between named entities are extracted from the document data, named entities and relations between named entities from the received extraction document data;

designating character strings corresponding to the named entities extracted among character strings in the received learning document data;

generating, by applying a relation extraction rule in which relations between categories of the named entities extracted from the extraction document data are defined, a learning document in which relations between named entities belonging to the categories defined by the relation extraction rule among the designated named entities are set; and learning the extraction dictionary based on the generated learning document.

7. A non-transitory computer readable storage medium storing a named-entity extraction processing program for causing a computer to function as:

a first storage that stores an extraction dictionary used when named entities of document data and relations between named entities are extracted from the document data;

a document receiving unit that receives input of extraction document data from which the named entities and the relations are extracted, and input of learning document data used for learning of the extraction dictionary;

an extraction unit that extracts, using the extraction dictionary, named entities and relations between named entities from the extraction document data received by the document receiving unit;

a designation unit that designates character strings corresponding to the named entities extracted by the extraction unit among character strings in the learning document data received by the document receiving unit;

a second storage that stores a relation extraction rule in which relations between categories of the named entities extracted from the extraction document data are defined;

a generator that generates, by applying the relation extraction rule stored in the second storage, a learning document in which relations between named entities belonging to the categories defined by the relation extraction rule among the named entities designated by the designation unit are set; and a learning unit that learns the extraction dictionary based on the learning document generated by the generator.

* * * * *